US008532846B2

(12) United States Patent
Tollenaere et al.

(10) Patent No.: US 8,532,846 B2
(45) Date of Patent: Sep. 10, 2013

(54) HELICOPTER SLING-LOAD STABILITY CONTROL AND RELEASE SYSTEM

(76) Inventors: Donald John Tollenaere, Seneca, SC (US); Timothy Edward Smith, Seneca, SC (US)

( * ) Notice: Subject to any disclaimer, the term of this patent is extended or adjusted under 35 U.S.C. 154(b) by 217 days.

(21) Appl. No.: 13/219,463

(22) Filed: Aug. 26, 2011

(65) Prior Publication Data

US 2013/0054054 A1    Feb. 28, 2013

(51) Int. Cl.
*G01C 23/00*    (2006.01)

(52) U.S. Cl.
USPC ............... 701/3; 701/13; 701/14; 244/75.1

(58) Field of Classification Search
USPC ............... 701/1, 3, 13–16; 244/75 R, 158 R, 244/75.1, 158.1
See application file for complete search history.

(56) References Cited

U.S. PATENT DOCUMENTS

| 4,780,838 | A | 10/1988 | Adelson |
| 4,998,763 | A | 3/1991 | Henke |
| 5,264,666 | A | 11/1993 | English et al. |
| 7,693,617 | B2 | 4/2010 | Dockter et al. |
| 7,954,766 | B2 | 6/2011 | Brainard et al. |
| 2007/0200032 | A1 | 8/2007 | Eadie |

*Primary Examiner* — Gertrude Arthur Jeanglaude
(74) *Attorney, Agent, or Firm* — Raymond L. Greene

(57) ABSTRACT

A sling load computer-operated hook assembly for helicopter or unmanned aerial vehicle (UAV) use is provided. The hook assembly allows automated pick-up and delivery. The computer hook assembly also (1) directs navigation of the aircraft, (2) finds and engages loads for pickup, (3) controls stability of the sling load enroute, and (4) releases the load at the delivery point. The self-contained feature allows the hook assembly to be moved from aircraft to aircraft. The hook assembly senses weight, motion and position of the load for stability control. An integral GPS unit is used to direct navigation. These data are transmitted to the aircraft autopilot and flight director instruments to provide navigation to the designated points and to control load stability enroute. Mission data for pick-up and release points can be received remotely from a command and control tactical data net. Alternately, mission data can be locally entered.

24 Claims, 14 Drawing Sheets

HELICOPTER SLING-LOAD STABILITY CONTROL AND RELEASE SYSTEM

FEDERALLY SPONSORED RESEARCH OR DEVELOPMENT

Not Applicable

FIELD OF THE INVENTION

The present invention relates to helicopter sling-loads and more particularly to automating payload stability control and payload pick-up, delivery, and release.

BACKGROUND OF THE INVENTION

Delivery and pick-up of payloads by helicopter slings allow the aircraft to remain airborne with no landing zone required and also allow the carriage of outsized equipment. Further, long tethers keep the aircraft away from terrain obstacles and rotor-induced visibility problems, such as dust brown-outs or snow white-outs. However, certain problems occur with long tethers. First is the problem of load stability during flight. A long tether can allow a load to oscillate or simply move to a point where the center-of-gravity limits of the aircraft are exceeded. Such a condition will make the aircraft uncontrollable.

Additional hazards occur when pick-up and attachment times are lengthy thereby exposing the aircraft to hostile fire and endangering ground crew members. Similarly, during delivery and release, delays and ground crew actions can expose both aircraft and ground crew to hostile action.

What is needed is a helicopter hook assembly which can provide stability data to the aircraft and which can automate pick-up and delivery of payloads.

BRIEF SUMMARY OF THE INVENTION

It is an object of the invention to provide a sling-hook assembly having automated load engagement, navigation, and delivery.

It is a further object of the invention to provide a sling-hook assembly having a local network communicating with external clients.

It is another object of the invention to provide a sling-hook assembly suitable for blind operations in instrument meteorological conditions, during white-outs, and brown-outs.

It is yet another object of the invention to provide a sling-hook assembly having a tactical data net communicating with command elements.

It is yet another object of the invention to provide data from hook sensors to an aircraft autopilot, such data driving an algorithm to maintain load stability and to maintain aircraft center-of-gravity limits.

The present invention is a computer-operated hook assembly, for use on a helicopter or unmanned aerial vehicle (UAV), which provides for automated pick-up and delivery of sling loads. The computer-operated hook assembly is a complete mission control device which is self-contained and portable between aircraft. The computer hook assembly (1) directs navigation of the aircraft, (2) finds and engages loads for pickup, (3) provides for stability control of the sling load enroute, and (4) releases the load at the delivery point. The self-contained feature allows the hook assembly to be moved from aircraft to aircraft, UAV or manned aircraft with minimal modification. The hook assembly senses weight, motion and position of the load through a series of sensors. The sensors include a 3-axes gyroscope providing pitch, roll, yaw, a MEMS 3-axes accelerometer, providing 3-plane acceleration, and a magnetometer providing heading data. An integral GPS unit within the hook assembly allows the hook computer to direct navigation to a selected drop site. These sensors and the load cell provide real-time data for load orientation and relative acceleration. These data are transmitted to the aircraft autopilot and flight director instruments to provide navigation to the designated points and to control load stability enroute. Mission data for locations of pick-up and release points can be received by the hook assembly remotely from a command and control tactical data net. Alternately, mission data can be locally entered using the pilot client or crew chief client to load mission data on the server-computer for operations not using a command network. The hook assembly provides the necessary data interface for hook control and load dynamic monitoring. Flight direction using an autopilot or other navigation devices use the data directly; for pilot displays, existing aircraft instrument displays are driven from the hook data, such as displays showing range and bearing to the target, course deviation for selected approach courses, or other existing instrumentation.

BRIEF DESCRIPTION OF THE DRAWINGS

The above and numerous other objects of the inventions that may be achieved by the preferred embodiment of the invention will be more readily understood from the following detailed description and the appended drawings wherein.

DETAILED DESCRIPTION OF THE INVENTION

Figure 1:
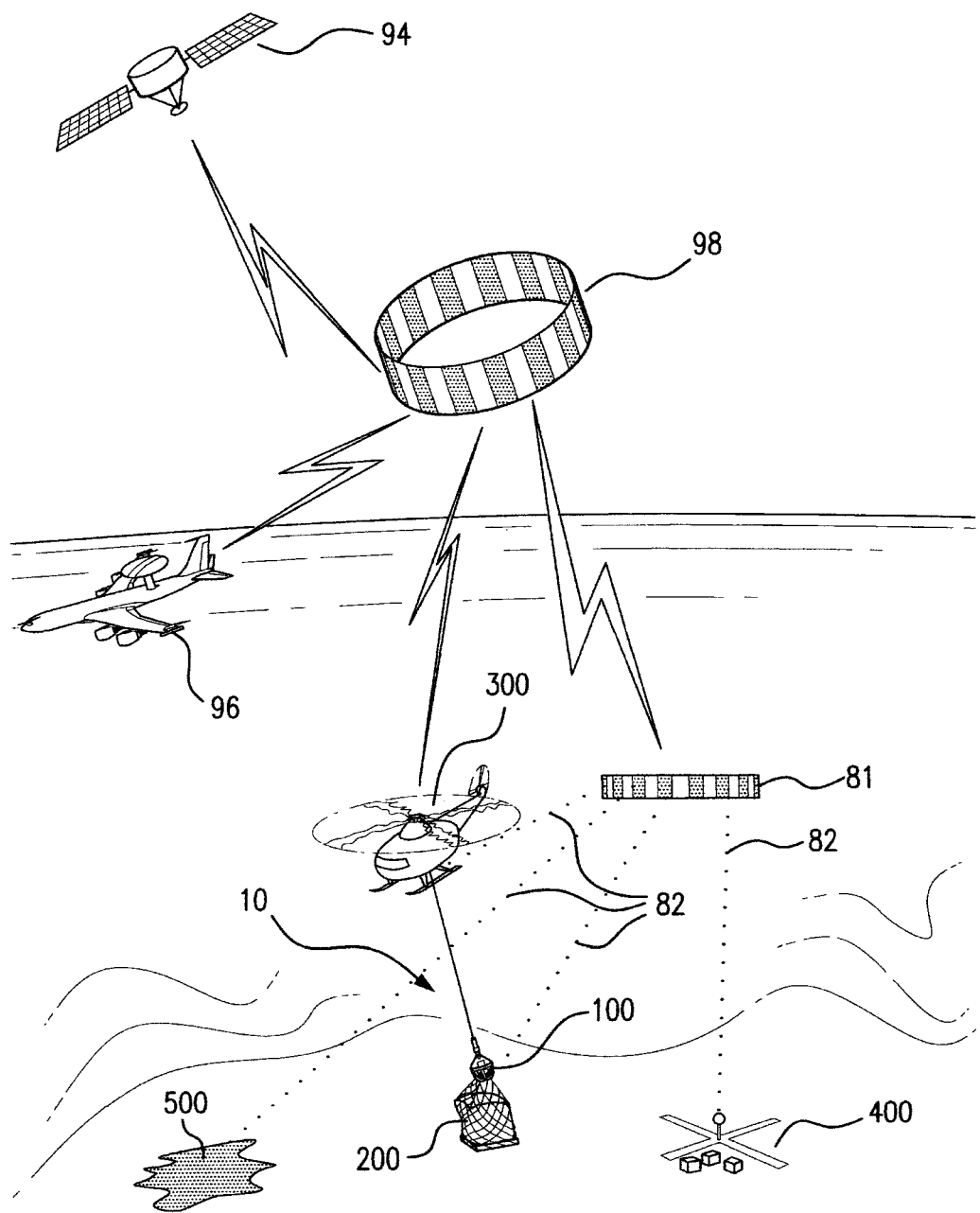
FIG. 1 is a schematic view of the invention showing communications connectivity, first with a command and control network for theater or global connectivity and second with the hook assembly centered local network, for hook client connectivity.

Referring now to FIG. 1, the helicopter sling load control system of the present invention, designated generally by the reference numeral 10, is shown in a representative operational network. The sling load control system comprises the sling line extending from the aircraft, the hook assembly which provides mission control and communications, and remote server clients located on the aircraft, the load, and the pickup and drop points. The hook assembly 100 communicates with the various clients using local data net 81 notionally represented with wireless connections 82 to the aircraft 300, load 200, pick up point 400, and drop point 500. Local data net 81 is formed by the server computer contained within hook assembly 100 in conjunction with the server clients, such as the aircraft 300 and the load 200 itself. The local data net 81, a short range system such as a WiMAX net, may not be in contact with all clients simultaneously. For example, the hook assembly can be in wireless contact with the pick up point 400 during load pick up, but may not be in wireless contact with the drop point 500 until the aircraft is within range of the drop point. Long range communications for mission tasking and reporting is accomplished using a tactical data net 98, notionally represented using global connections to tactical nodes such as an Airborne Warning and Control Aircraft 96, satellite 94, or other nodes. A typical architecture uses the joint tactical information distribution system, JTIDS, which is a spread-spectrum, frequency-hopping system in the L-band. The overall architecture provides the server computer in the hook assembly as the master node for local client devices while the server computer is a client of the long range tactical net. Mission tasking to the hook assembly can be directed from any location which can link to the tactical data net. Alternately, mission tasking can be directed locally by clients of the hook assembly, such as the ground controller at pick-up or drop points, the crew chief and the pilot.

Figure 2:
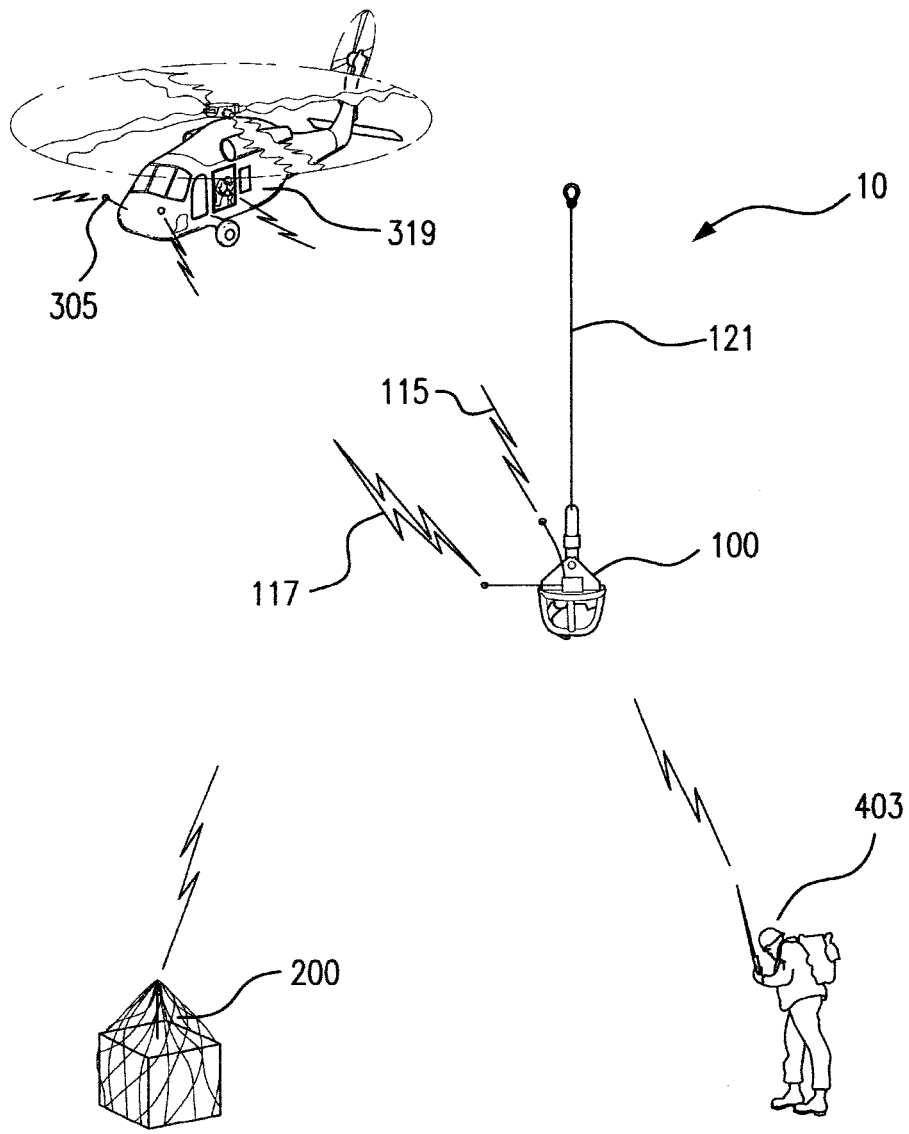
FIG. 2 is a depiction of the computer-server hook assembly with the local network clients, that is, the aircraft instrument system, pilot/operator station, crew chief station, payload, and ground crewmember.

Referring now to FIG. 2, the helicopter sling load control system 10 is shown with its associated components. The system comprises a server computer integrated into the hook assembly 100 that communicates with all other system components as clients using a wireless local network, depicted by narrow transmission symbols 115. The server computer provides control of all hook operations including data necessary for aircraft navigation to load pick-up locations, identification of the load, engagement of the load, identification of the intended delivery location, and data necessary for navigation to the delivery location and release of the load 200. Once programmed, these operations can be accomplished automatically by the hook and associated aircraft without human operator actions. Various operations can also be accomplished by the clients, pilot 305, crew chief 319 or ground crew 403 interaction. These operations include identification of the load, the load weight, destination, and type. Also, actions include override commands such as load release commands from the pilot or ground crew or even complete mission programming can be made from the pilot and crew chief clients. Communication between hook assembly 100 and the various client components is accomplished by a local area wireless net depicted here by narrow transmission symbol 115. In order to provide radio silent operation and to provide redundant backup, a wired connection is also provided inside synthetic line assembly 121 for communications between the hook assembly and the aircraft. The synthetic line assembly has a protective cover preventing damage and reducing RF emissions from the internal wire. An alternate configuration uses a fiber optic cable in place of an internal wire. These communications are between the aircraft instrument bus, aircraft autopilot, the crew chief and the pilot. Long range communications are provided by tactical data, such as JTIDS, depicted here by broad transmission symbol, 117.

Figure 3:
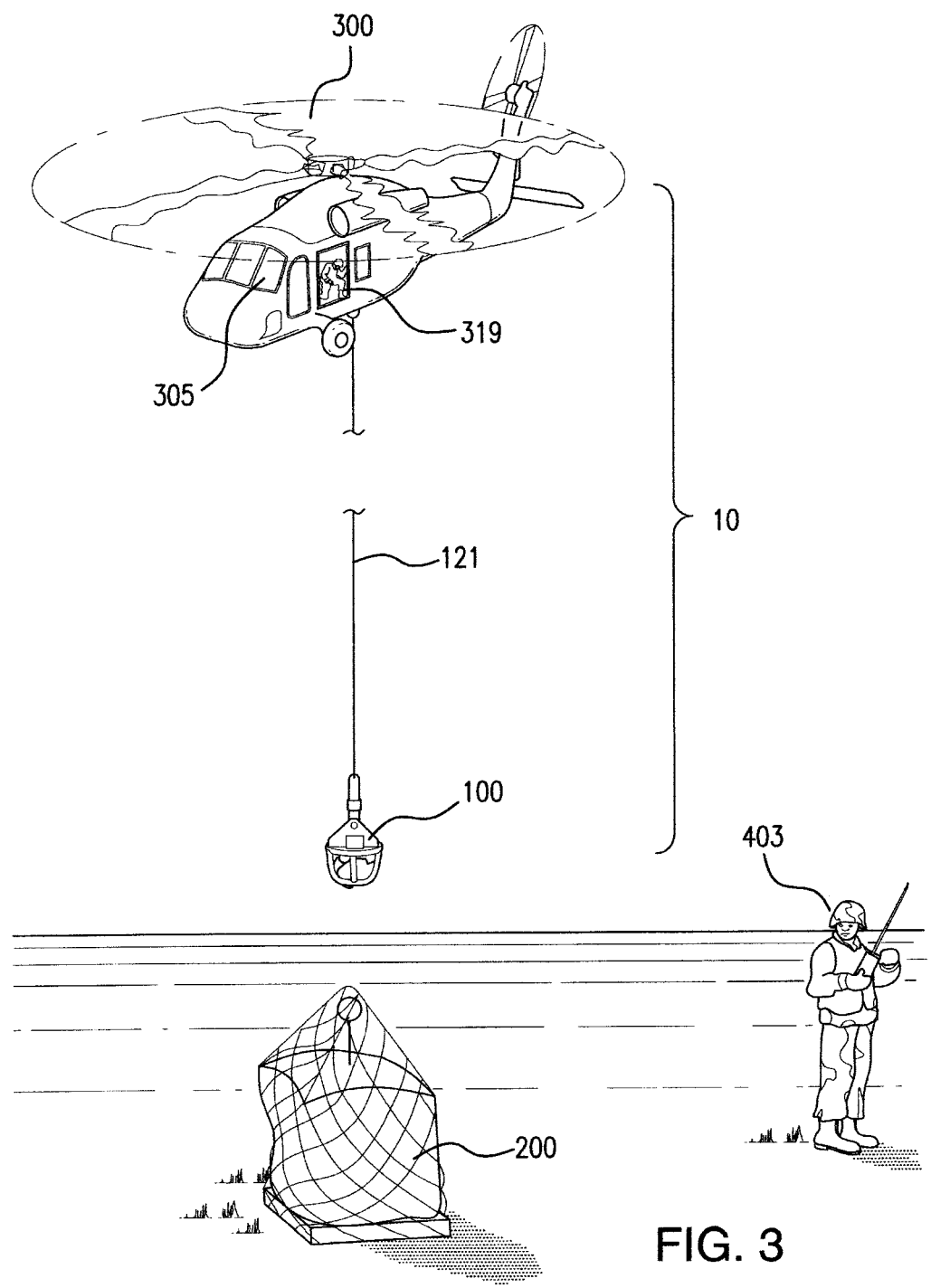
FIG. 3 is a depiction of the computer-server hook assembly and external clients for a manned aircraft.

FIG. 3 depicts a typical set-up of the sling load control system 10 as installed on an aircraft 300. With a manned aircraft, the sling-load control system may be operated remotely by tactical data net as previously described, but may also be operated independently by the aircraft crew. In the independent operation mode, the pilot 305 or crew chief 319 can program the server computer in hook assembly 100 using data entry stations in the aircraft. This programming may be accomplished by local net or by hardwire in synthetic line assembly 121. A ground crew member 403 at the pick up location must set up the load 200 for pick up suitable for grapple and with identification information.

Figure 4:
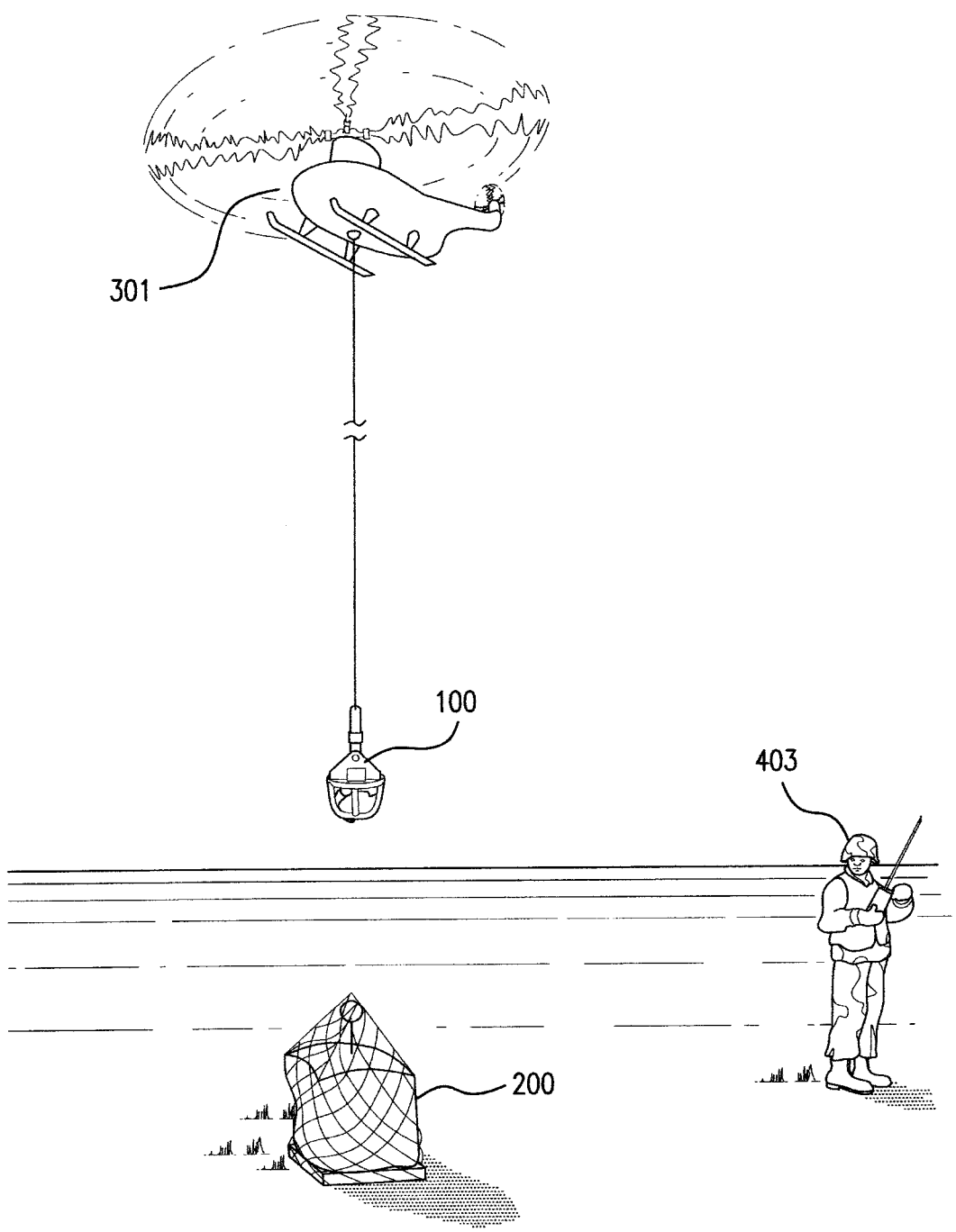
FIG. 4 is a depiction of the computer-server hook assembly and external client for an unmanned aerial vehicle (UAV) application.

In FIG. 4, a typical set-up for an unmanned aerial vehicle (UAV) 301 is shown at a load pickup location. Sling cable connects to the attachment points or suspension lugs thereby connecting UAV 301 to the hook assembly 100. With this connection, data is transferred from the hook assembly 100 to the navigation and autopilot busses within the aircraft. This feature allows radio silent operation after load pick up, while enroute to the load drop point. Operations of ground crew 403 and load 200 are the same as for the manned aircraft.

Figure 5:
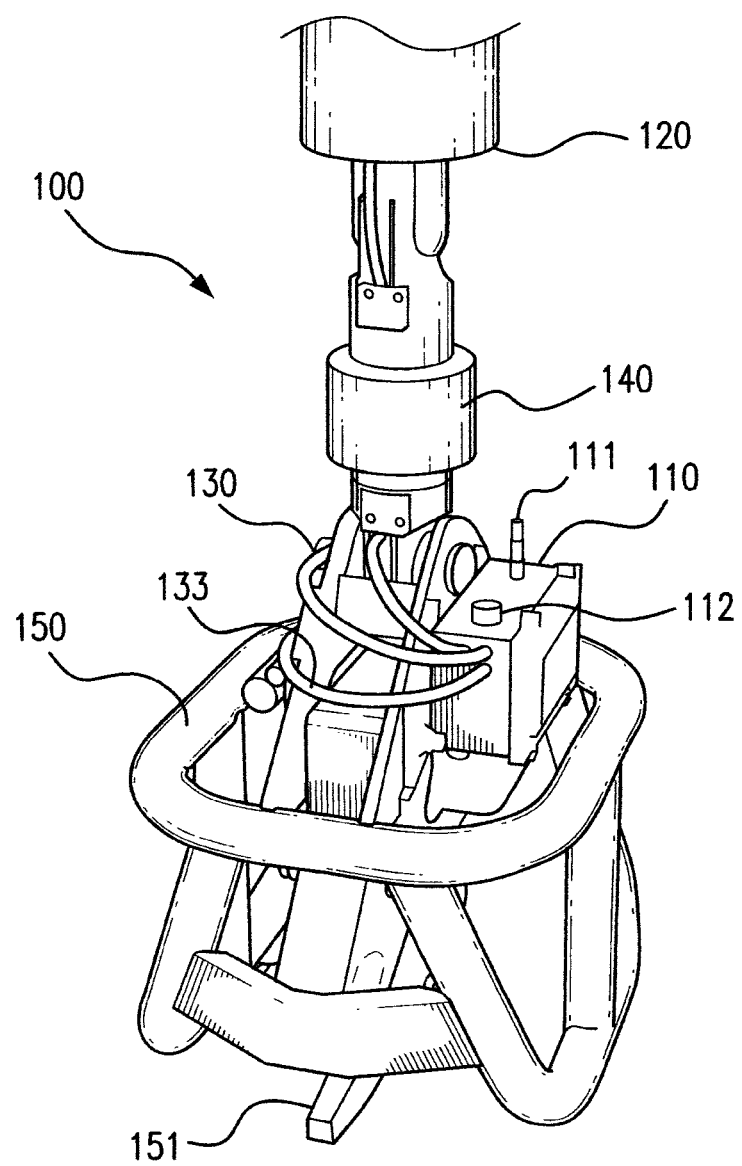
FIG. 5 is a perspective view of the computer-operated hook.

Referring now to FIG. 5, a perspective view of the hook assembly 100 is shown with the associated major components. An optional battery 120 is attached to the sling line (not shown) providing power to the hook assembly. Power can also be supplied directly from an aircraft by a hardwired connection. An electric swivel 140 connects power and the internal wires from the aircraft to the hook assembly 100. A wrist pin with a load cell 130 pivotally attaches the hook assembly 100 to the power supply and sling line. A server computer is located in enclosure 110 which has a GPS receiver antenna 112 and RF antenna 111. A hook guard 150 surrounds the hook assembly to protect components from impact damage. The hook 151 is computer controlled and actuated by a solenoid protected in the retracted position by hook guard 150.

Figure 6:
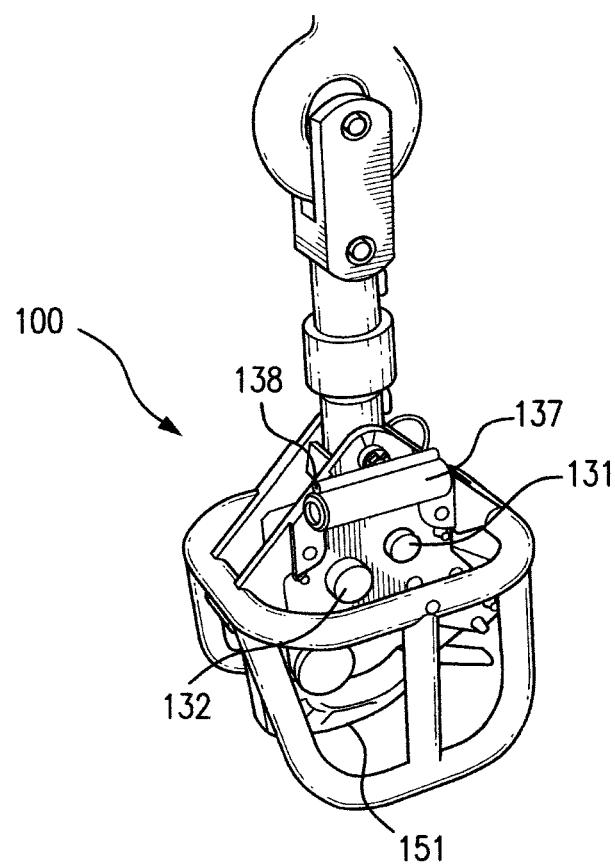
FIG. 6 is a perspective view of the computer-operated hook showing the reverse side with locking pins.

Referring to FIG. 6, the reverse side of hook assembly 100 is shown with two pins controlling hook locking. Unlock pin 132 is used for manually unlocking of hook 151. Lock-mode pin 131 is operated by a solenoid and has two positions, "auto" and "locked" In the "auto" mode the hook computer controls the hook 151 through the various sequences previously described, that is, meeting altitude, and location and identification delivery parameters. Also, in the"auto" mode the pilot and crew chief may over-ride the delivery parameters and release the load manually and stop an automatic release. In an operational mission, the pilot or crew chief can therefore adapt to fluid battle lines. In the "locked" mode, the load can be autonomously delivered to a drop point but must be manually released by a ground crews member using unlock pin 131. This mode is useful for delivery of high valve cargo which must not be inadvertently released. Such a cargo might include personnel baskets, litters, and the like. The server also provides an infrared port 138 that allows clients to be trained to the server thereby ensuring that data broadcast from the server is only readable by the trained clients. During the training operation, client and server security keys and addresses are exchanged for encryption. This information is used to direct communications within the server/client protocol. During the training phase, the client designated to perform control operations at the server is determined. The training protocol allows specific control operations to be restricted to certain clients. The communication medium preferred is RF to enable remote viewing of load data by systems external to the individual helicopter. Security and reliability however may dictate use of communication to the helicopter via fiber or wires. Infrared port 138 can be configured to serve as a sensor for detecting an infrared source on the load during pick up. Using the sensor function, fine navigation to the load can be accomplished autonomously, particularly when operating with UAV aircraft. Remote viewing of the forward and rearward visual field is provided wide-angle cameras located at either end of camera tube 137. The forward facing camera lens has a vertical cursor line etched at zero degrees (aligned with the hook) and at 30 degree increments across the lens, providing a view field more than 120 degrees. This feature allows visual guidance by a remote pilot during hook operations and also allows reconnaissance of drop zones or any other zone. Clients can be configured for various uses that include interfaces with helicopter fly-by-wire systems, pilot graphical readouts, load specific data acquisition and control, and load management systems on the ground. The server location near the load and attached to the lifting device allows for use on multiple aircraft and is not manufactured into the aircraft itself. The portable nature of the system allows for use in the field with existing load operations.

Figure 7A:
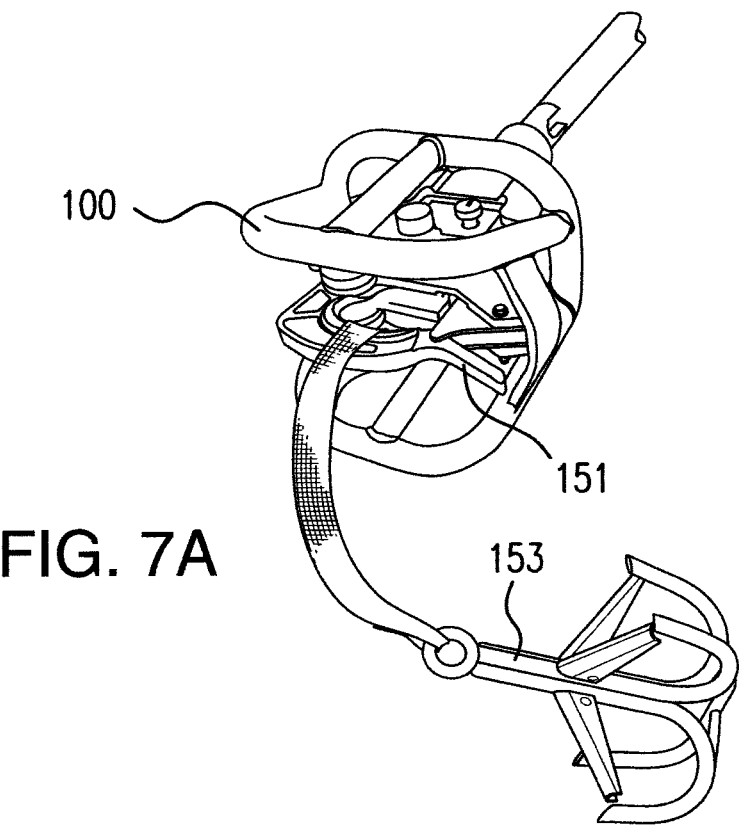
FIG. 7A is a perspective view of the hook assembly using a grapple hook configuration.
Figure 7B:
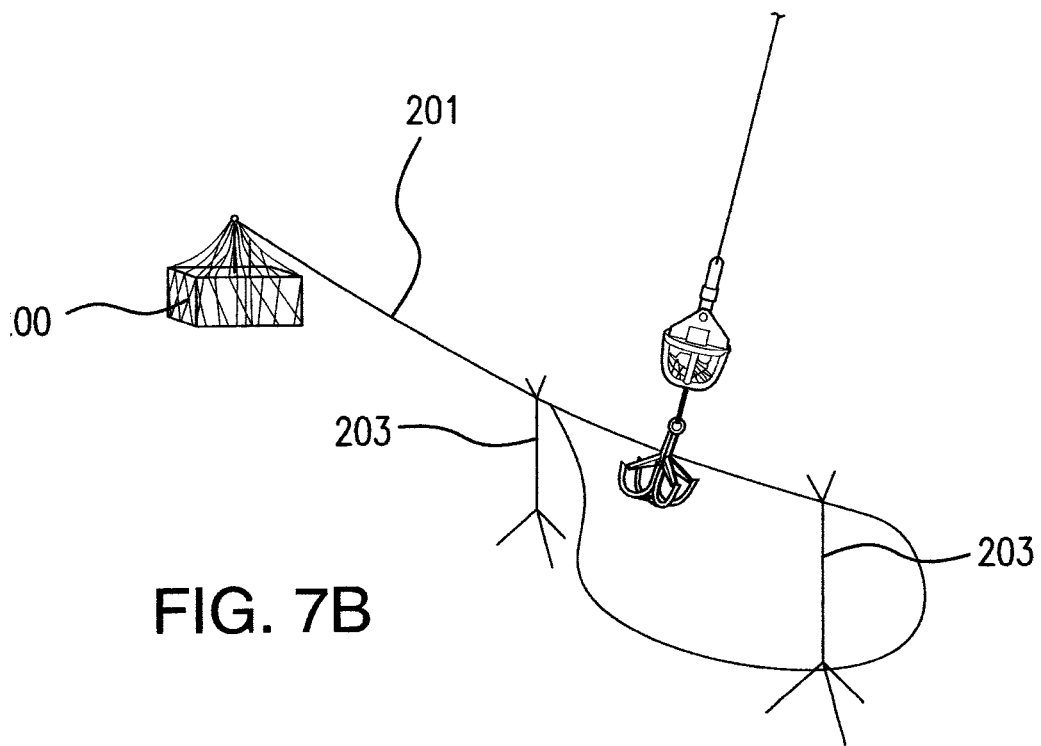
FIG. 7B is a perspective view of the grapple hook engaging a load pickup.

FIG. 7A is a perspective view of hook assembly 100 with grapple hook 153 attached by strap to the hook 151 in the hook assembly 100. FIG. 7B depicts engagement of a tether cable 201 attached to load 200. Supports are set up by the ground crew, tether supports 203, facilitating crew chief or pilot directed pickup of load 200. During release of load 200, hook 151 shown in FIG. 7A is released and the load and the grapple are released. A ground crewman is required to reload the grapple, either at the drop location or at another pickup location.

Figure 8:
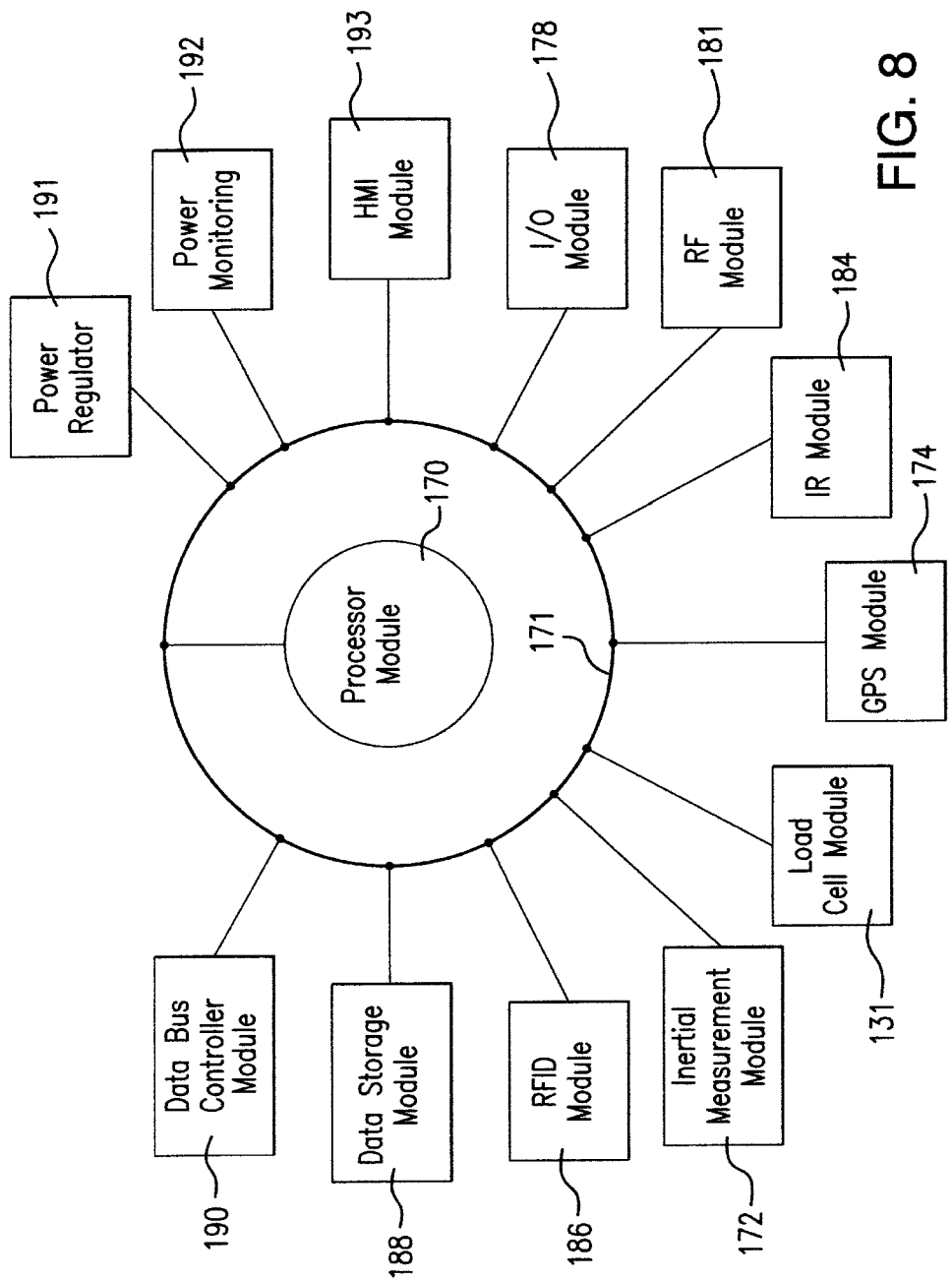
FIG. 8 is a schematic diagram of the functional elements forming the computer and associated components on the accessory.

Referring to FIG. 8, a functional diagram of the elements forming both the server computer and the client computers. The minimal server configuration includes all elements shown in FIG. 8 except the RFID module 186. The minimal client configuration includes controller 170, server accessory bus 171, power regulation 191, power monitoring 192, human-machine interface 193, RF module 181, IR module 184, data storage 188, and data bus control 190. It is possible to operate with various elements missing or inoperative with reduced capabilities. For example, if no RFID capability is available, either due to damage or no tagging of the load, then information from the load specification will not be available. Compensation for elements not available can be accomplished by manual actions of crew members. The micro-controller 170 and server accessory bus 171 shown in FIG. 8 are located within the hook assembly. The connections shown are functional, that is, load cell 130, shown in FIG. 5, is physically connected to the sling line, but is functionally connected through load cell module 131 to server accessory bus 171. The micro-controller 170 is the heart of the system which receives data from the modules along the server bus, depicted by solid lines. From the inertial measurement module 172, the micro-controller 170 determines the motion of the load in order to provide damping functions to the aircraft system. From the GPS module 174, the micro-controller 170 receives location information and provides navigation data to the aircraft systems. As the micro-controller 170 receives orthogonal linear acceleration data from MEMS micro-sensor and orthogonal angular acceleration data from the 3-axes gyro, a particular flight load may be evaluated for airworthiness by monitoring the data for excursions. While not a formal flight certification, the process is especially useful for loads not certified, such as a damaged helicopters or vehicles.

All modules provide data to the micro-controller 170, but only two modules are used by the micro-controller 170 for outbound data. The first module is the RF (Radio Frequency) module 181 used by the micro-controller 170 to communicate with the clients during pickup and delivery of payloads. The second element is the direct wired line using input-output module 178 providing data directly to the aircraft via the sling line and which allows radio silent operation. Infrared Module 184 provides an infrared transmitter-detector for load tracking and identification. The infrared module 184 provides terminal navigation information, the fine navigation for autonomous engagement of the load by the hook. Untrained server clients also use the infrared module for client training, that is synchronization with the server-computer. A radio frequency identification module, RFID module 186, provides both passive and active radio frequency identification functions. Several other modules are linked to bus 161 for data storage 188, data bus control 190, power regulation 191 power monitoring 192, and a human-machine interface module, the HMI module 193. HMI module 193 provides graphic outputs for cockpit displays, user inputs, man machine data, and operational control.

Figure 9:
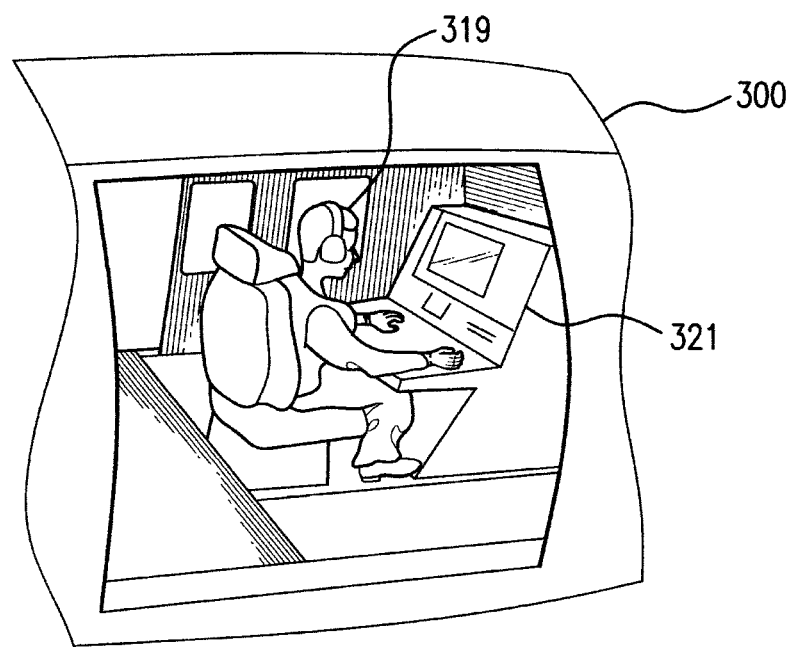
FIG. 9 is a perspective view of the crew chief station inside the helicopter.

Referring to FIG. 9, a perspective of a crew chief 319 located in aircraft 300. The master crew chief station 321 is a client of the server computer and is connected to the server computer by hardware or fiber optic line embedded in the sling line (not shown). This "master" station can communicate in L-band or other tactical nets and can display multiple operational locations and multiple loads. An alternate crew chief controller is a simple hand held device as used by the ground crew shown in FIG. 10. The crew chief can also communicate with the hook assembly by local wireless net (not shown in this figure). The crew chief client has full operational control of the computer-hook assembly and can program pick-up and drop points, initiate load release and engagement. Once programmed, automated aircraft functions, such as load stability, flight path, and such parameters continue to be controlled by the server-computer hook assembly.

Figure 10:
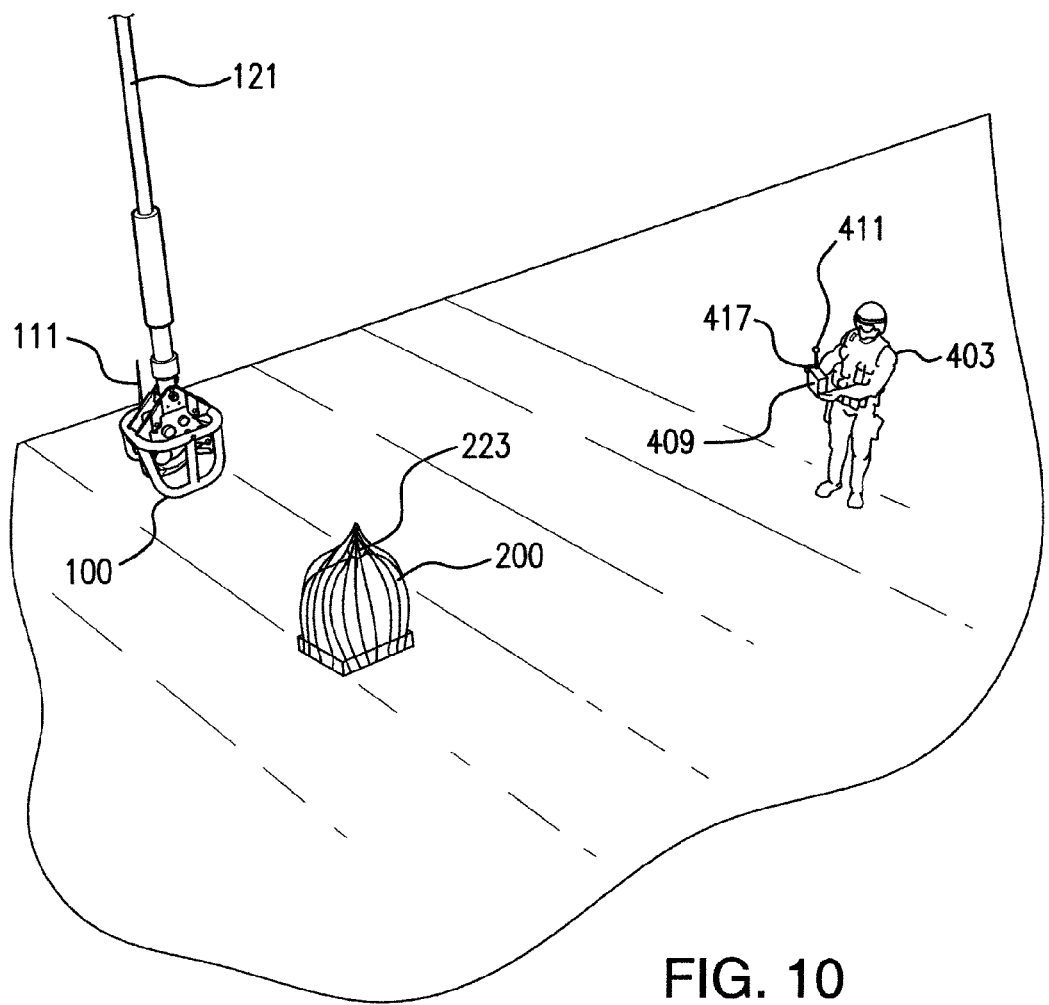
FIG. 10 is a perspective view depicting the hook assembly operated by a ground crew member.

FIG. 10 depicts the interaction of the server-computer hook 100 assembly with the load 200 and ground crew man 403. Ground crewman 403 uses a hand-held client 409 with RF antenna 411 to communicate with the hook assembly 100 shown with RF antenna 111. The load 200 has a beacon 223 attached allowing the hook assembly to locate the load and send steering commands through synthetic line assembly 121 to the aircraft. The ground crew hand-held module provides identification verification to the hook assembly (and therefore to the pilot and crew chief) and also provide GPS location and load designation by laser pointer 417.

Figure 11:
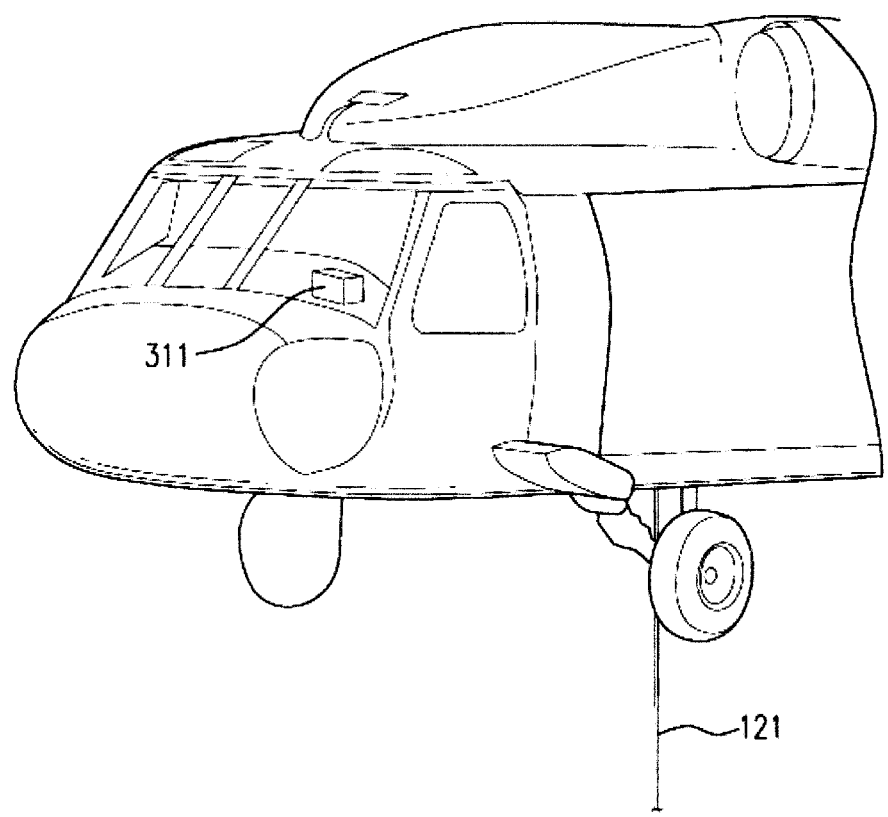
FIG. 11 is a perspective view of the helicopter-mounted controller shown with a representative installation on a helicopter.

Referring now to FIG. 11, a typical aircraft pilot client 310 is shown in an aircraft connected to the hook assembly, not shown, by synthetic line assembly 121 and by local wireless net. The pilot client 310 is a data entry device allowing the pilot to enter pickup, drop off points, load identification and other parameters. The actual navigation display showing flight path, range and bearing to the target, and so on, uses existing aircraft instrumentation driven bus data from the computer hook assembly.

Operation of the Invention

Figure 12:
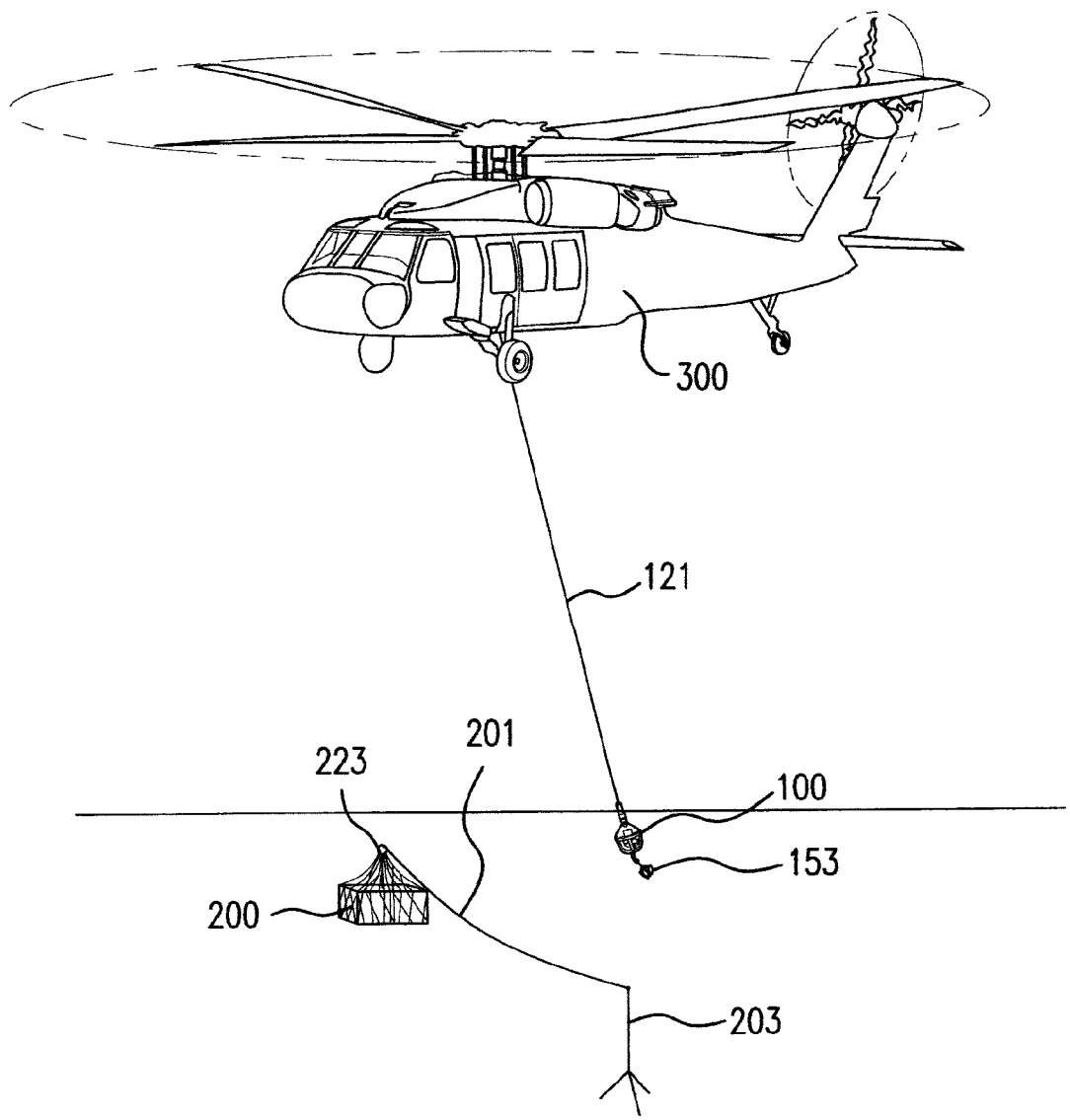
FIG. 12 is a perspective view of a helicopter during load pick-up.

Referring now to FIG. 12, on automated load pick up is depicted. As aircraft 300 approaches the programmed GPS coordinates, the hook assembly 100 establishes wireless contact with load 200 via a local wireless net. In this figure, a manually controlled pickup by aircraft 300 is depicted engaging tether cable 201, such cable supported by tether support 203. In the autonomous mode, hook assembly 100 detects beacon 223 on the load to complete terminal navigation to the load. The hook assembly 100 also interrogates the load 200 for proper RFID to verify the load information on the pick up location, load identification and drop locations are already loaded in the server computer in the hook assembly. As the hook approaches the beacon, typically located in a cargo net pick up point, the grapple 153 engages the load 200.

Figure 13:
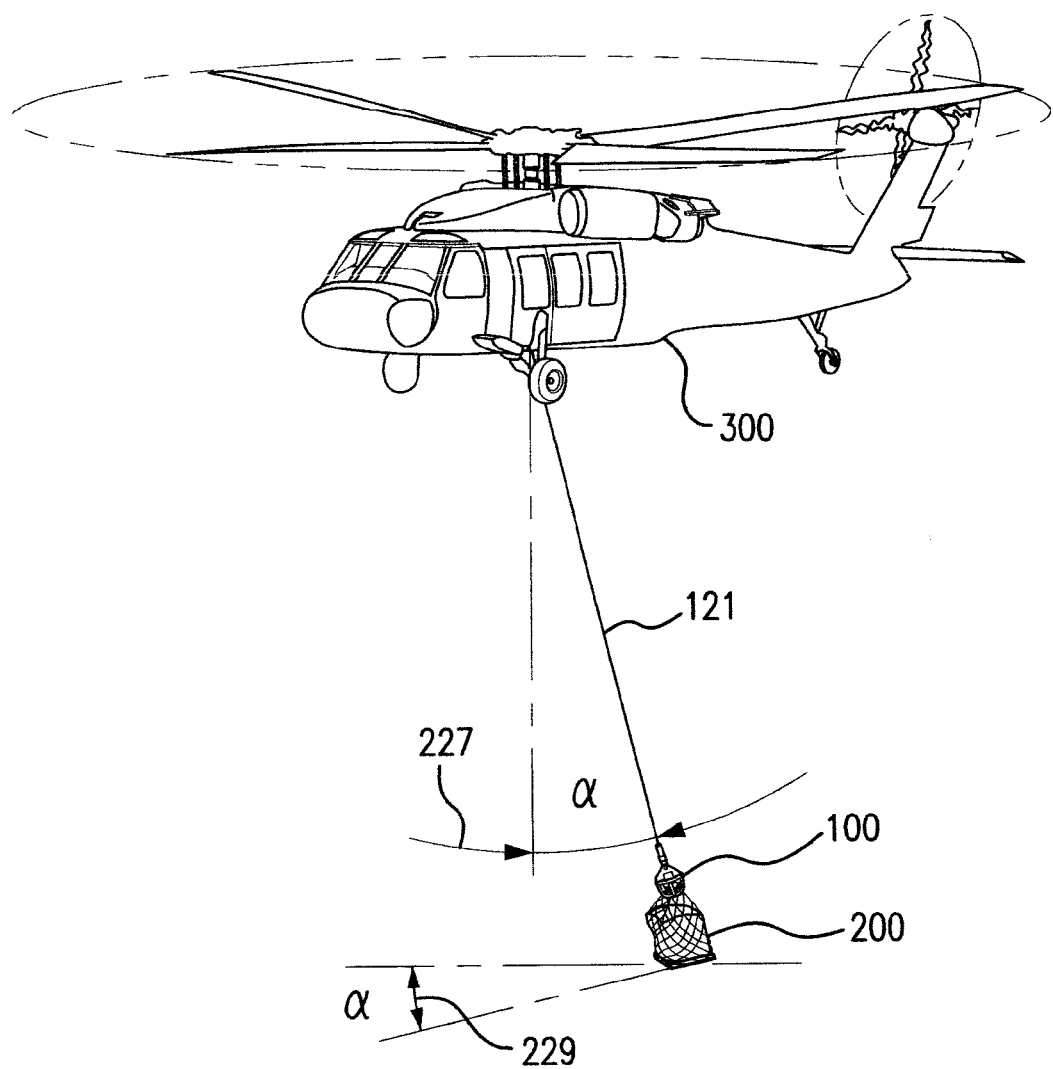
FIG. 13 is a perspective view during flight showing load stabilization.

FIG. 13 depicts the load 200 enroute with the server computer in hook assembly 100 determining sling line angle. Immediately after load pick up the server computer zeros out the sling line angle based on the attitude of the suspended load 200. It is not necessary that the load be picked up level. Whatever load angle the initial pick up produces is treated as "zero" angle. The server computer monitors load dynamics using an internal 3-axes gyro and internal 3-axes MEMS accelerations sensors (micro-electrical-mechanical sensors). This load dynamics data allows server computer and hook assembly 100 to provide data necessary for calculation of sling load line angle. Thereafter as the load moves away from the zeroed position, the load will pitch downward at a small angle 229 as the sling line moves aft (helicopter speed increases). This pitch down angle is the same as the angle 227 of the synthetic line assembly 121 from the vertical. The helicopter can only allow small displacements of the load from the center of lift. Otherwise, the helicopter can become uncontrollable. The hook assembly is pre-programmed for the particular aircraft for limits on load displacement. The hook also compensates for the weight of the load, determined from the load sensor in the hook assembly. A heavier load must be more closely controlled, whereas a lighter load can move further from the aircraft center-of-lift. Based on these measurements, the server-computer provides flight path and velocity commands to the aircraft bases on an internal algorithm within the server computer. By comparison of dynamics data from the aircraft with the dynamics of the hook assembly, all motion except relative motion between the aircraft and hook is zeroed out. Enroute, using relative dynamics, velocity, acceleration and position, the server computer directs load motion damping actions to the aircraft autopilot or to the aircraft stability augmentation system, if available. Also enroute, the local area net is shutdown so that radio silence is maintained.

Figure 14:
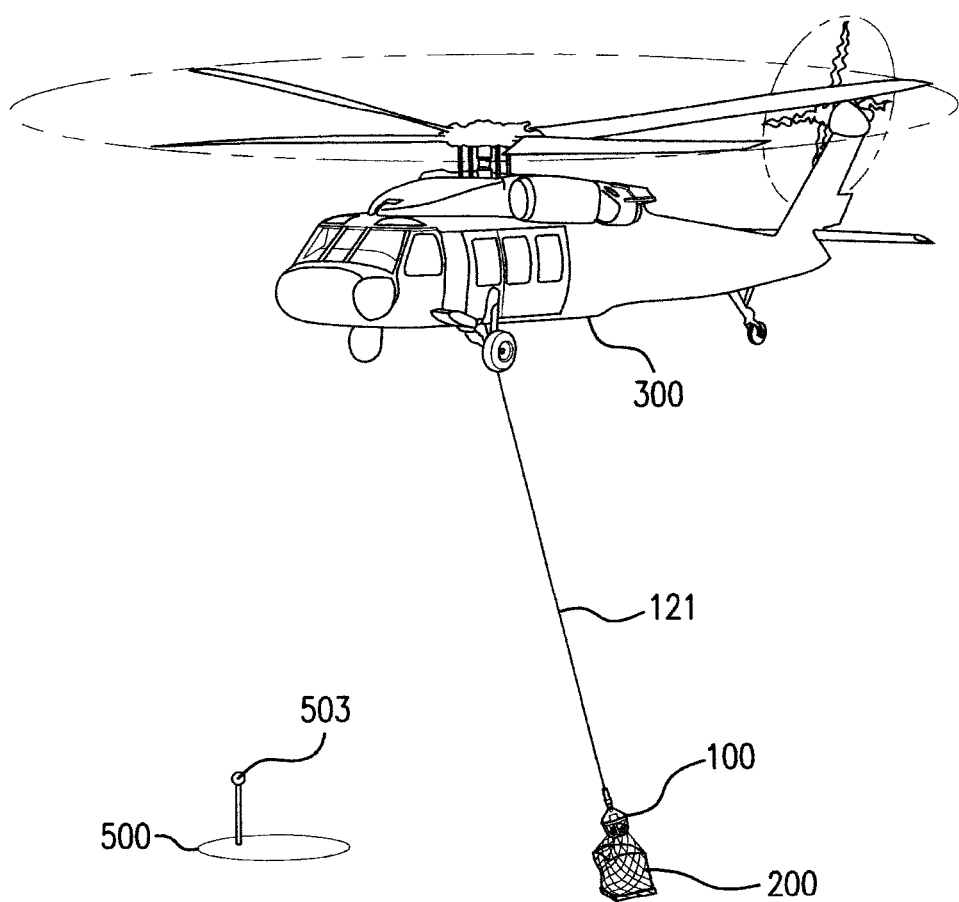
FIG. 14 is a perspective view showing load delivery.

Referring to FIG. 14, aircraft 300 is approaching the load delivery point 500. The computer hook assembly 100 suspended at the end of synthetic line assembly 121 is navigating load 200 toward the delivery point 500. The hook assembly 100 senses beacon 503 for terminal navigation and transmits this data to the aircraft 300 as steering and altitude commands. An RFID tag at the drop point confirms the drop zone identification. When the load is delivered to the drop zone, automatic release of the load occurs when the hook is unloaded, that is, when the load rests on the ground as determined by the load cell 130 (not shown in this figure). A delay time is incorporated so the momentary unloads, such as air turbulence, cannot activate the release. There are two requirements for automatic release; first, the hook assembly must have arrived at the GPS coordinates, and, second the load must be supported with weight off the hook. The load may also be manually released by ground crewman 200 using a hand held client transmitter 211. For manual release, two requirements must be met; first the RFID transmission from the ground crewman 200 must be correct; and second, the ground crewman must send a release command to the server computer in the hook assembly. Alternately, the ground crewman can operate the unlock pin 131 shown in FIG. 6.

The features and advantages of the invention are numerous. The computer-controlled hook assembly is a portable, self-contained system which can be easily moved from aircraft to aircraft. The command steering data from the hook server-computer connects to standard aircraft instrument busses allowing autopilot steering. The computer-centric configuration provides for complete mission control, load identification, pick-up, transport, and delivery using the hook system alone. No onboard aircraft, other than autopilot, are required. The hook system finds the load and identifies the load, without pilot assistance, in instrument conditions, right operation, dust brow-out conditions, and snow white-out conditions. Enroute, the system monitors and dynamically stabilizes the load. The system operates with no radio emissions during most operations except at the pick-up and delivery points. All of these operations are performed without operator or pilot inputs. However, each phase of the operations have operator over-ride features, should it become necessary for a ground operator, pilot, or crew chief to intervene. Operation of the computer hook assembly is controlled by the hook itself. The hook communicates with aircraft navigation system to direct the aircraft to a load.

Many variations will be apparent to those skilled in the art. For example, various different communication nets can be used, both global and local. Additionally, beacon sources for load pick up can be various infrared, electro-optical and laser designator devices.

What is claimed is:

1. A helicopter sling-load control system comprising:
a sling-load assembly having a computer-operated hook, controlled by a server computer assembly contained within the hook;
at least one external controller configured as a client in communication with said server computer assembly;
said server computer assembly containing an accessory bus connected to a plurality of load dynamics sensors;
said load dynamics sensors comprising three micro-electrical-mechanical system sensors aligned in perpendicular planes configured as a 3-axes linear accelerometer including orientation sensors providing yaw, roll and pitch of a sling pay load.

2. A helicopter sling-load control system as in claim 1 wherein said orientation sensors include a 3-axes gyro.

3. A helicopter sling-load control system as in claim 1 wherein said orientation sensors generate data defining the sling-line angle with respect to a vertical reference extending below the aircraft.

4. A helicopter sling-load control system as in claim 1 wherein said load dynamics sensors include a load cell measuring forces applied to said hook.

5. A helicopter sling-load control system as in claim 4 wherein said load dynamics sensors include a battery, battery monitor and temperature sensor.

6. A helicopter sling-load control system as in claim 1 wherein said sling-load assembly further comprises a synthetic line assembly connected to an external load attachment point of a helicopter.

7. A helicopter sling-load control system in claim 6 wherein said synthetic line assembly further comprises an embedded electrical line extending from the hook to the helicopter with a protective cover enclosing both the synthetic and electrical lines.

8. A helicopter sling-load control system as in claim 1 wherein said computer-operated hook includes a lock-mode pin and an unlock pin.

9. A helicopter sling-load control system as in claim 8 wherein said lock-mode pin is a solenoid actuated pin connected to the electrical line.

10. A helicopter sling-load control system as in claim 8 wherein said unlock pin is a manually-operated pin.

11. A helicopter sling-load control system as in claim 1 wherein said accessory bus is connected to a wireless local area net device exchanging data and commands with external controllers.

12. A helicopter sling-load control system as in claim 1 wherein said accessory bus is connected to an input-output module.

13. A helicopter sling-load control system as in claim 12 wherein said input-output module is connected to a solenoid actuating said computer-operated hook.

14. A helicopter sling-load control system as in claim 1 wherein said external controller comprises an aircraft client connecting said server computer to the aircraft instrument bus and autopilot.

15. A helicopter sling-load control system as in claim 14 wherein said external controller further comprises an aircraft pilot client having a wireless connection to said server computer.

16. A helicopter sling-load control system as in claim 14 wherein said external controller further comprises a crew chief client connected to said server computer.

17. A helicopter sling-load control system as in claim 14 wherein said external controller further comprises a ground crew client providing a wireless connection to said server computer.

18. A helicopter sling-load control system as in claim 14 wherein said external controller further comprises a payload client providing a wireless connection to said server computer.

19. A helicopter sling-load control system as in claim 17 wherein a radio frequency identification device is connected to said accessory bus.

20. A helicopter sling-load control system as in claim 19 wherein said payload client further comprises a radio frequency identification device communicating with the radio frequency identification device on the computer accessory bus.

21. A helicopter sling-load control system as in claim 1 comprising wherein said micro-electrical mechanical system sensors provide helicopter sling-line angle data.

22. A helicopter sling-load control system as in claim 17 wherein said accessory bus further includes a tactical data net device for connection to a theater data net.

23. A helicopter sling-load control system comprising:
a synthetic line assembly for attachment to suspension lugs of a helicopter;
a computer-operated hook assembly attached to said synthetic line assembly;
a client server computer located in said computer-operated hook assembly;
an accessory bus connected to the client server computer;
a load cell connected to said accessory bus providing payload data to said client server computer;
a plurality of orientation sensors providing yaw, roll and pitch data to said client server computer;
a global positioning system sensor connected to said accessory bus;
a hook actuator solenoid connected to said accessory bus providing physical operation of the computer-operated hook;
a wireless aircraft controller client communicating with said client server computer said controller providing flight control data to an aircraft autopilot;
a pilot wireless controller client communicating with said client server computer providing for pilot operation of said hook;
a crew chief wireless controller client communicating with said client server computer providing for crew chief operation of said hook;
a ground crew wireless controller client communicating with said client server computer;
a payload wireless controller client communicating with said client server computer;
a radio-frequency identification device connected to said server computer accessory bus;
a radio frequency identification device communicating with the radio frequency identification device attached to the server computer accessory bus; and
a lock-mode pin located on said computer-operated hook assembly communicating with said radio frequency identification receiver, said pin unlocking operation of the hook when within range of the radio frequency identification device.

24. A helicopter sling-load control system comprising:
a sling-load assembly having a computer-operated hook, connected to and controlled by a server computer assembly;
an accessory bus attached to the server computer assembly;
a global positioning system sensor connected to said accessory bus;
a joint tactical information distribution system transmitter receiver connected to the server computer accessory bus for theatre communications;
a wireless local area net providing communications between the hook and clients;
an orthogonal configuration of three micro-mechanical-electrical sensors providing inertial acceleration and position of said hook;
an orthogonal configuration of 3-axes gyros providing inertial attitude, roll, pitch, and yaw, of said hook;
a plurality of external controllers configured as clients and communicating with the server computer assembly; and
at least one of said external controllers is configured for an aircraft instrument and autopilot interface.

* * * * *